(12) United States Patent
Shrinagar et al.

(10) Patent No.: US 12,212,465 B2
(45) Date of Patent: Jan. 28, 2025

(54) SYSTEM AND METHOD FOR AUTO-COMMISSIONING OF NETWORK DEVICE

(71) Applicant: Rakuten Mobile, Inc., Tokyo (JP)

(72) Inventors: Gourish Shrinagar, Madhya Pradesh (IN); Ram Metkar, Madhya Pradesh (IN); Apoorva Soni, Madhya Pradesh (IN)

(73) Assignee: RAKUTEN MOBILE, INC., Tokyo (JP)

( * ) Notice: Subject to any disclaimer, the term of this patent is extended or adjusted under 35 U.S.C. 154(b) by 0 days.

(21) Appl. No.: 17/791,209

(22) PCT Filed: Apr. 18, 2022

(86) PCT No.: PCT/US2022/025163
§ 371 (c)(1),
(2) Date: Jul. 7, 2022

(87) PCT Pub. No.: WO2023/204793
PCT Pub. Date: Oct. 26, 2023

(65) Prior Publication Data
US 2024/0179061 A1    May 30, 2024

(51) Int. Cl.
| G06F 13/00 | (2006.01) |
| H04L 41/08 | (2022.01) |
| H04L 41/0806 | (2022.01) |

(52) U.S. Cl.
CPC ...... *H04L 41/0886* (2013.01); *H04L 41/0806* (2013.01)

(58) Field of Classification Search
CPC ............ H04L 41/0886; H04L 41/0806; H04L 41/0843; H04L 67/34; H04L 41/082
USPC ......................................... 709/220–222, 245
See application file for complete search history.

(56) References Cited

U.S. PATENT DOCUMENTS

| | | | |
|---|---|---|---|
| 9,621,418 B2 * | 4/2017 | Gibson | H04W 52/46 |
| 9,882,726 B2 * | 1/2018 | Ma | H04L 63/0823 |
| 10,263,836 B2 * | 4/2019 | Jain | H04L 41/0686 |
| 11,095,614 B2 * | 8/2021 | Kuppannan | H04L 63/0236 |
| 2015/0271008 A1 | 9/2015 | Jain et al. | |
| 2016/0277413 A1 | 9/2016 | Ajitomi et al. | |
| 2016/0344559 A1 | 11/2016 | Ma et al. | |
| 2017/0078140 A1 | 3/2017 | Gibson | |
| 2020/0366648 A1 | 11/2020 | Kuppannan et al. | |

* cited by examiner

*Primary Examiner* — Kenneth R Coulter
(74) *Attorney, Agent, or Firm* — HAUPTMAN HAM, LLP

(57) ABSTRACT

A computer-implemented method for network switch auto-commissioning includes generating, automatically, a device configuration file that includes parameters and initial settings for a network device; generating, automatically, a delta file that includes parameters and initial settings for a mobile backhaul (MBH) node communicatively connected to the network device; transmitting the device configuration file to the network device; obtaining an IP address pool for the network device and connected network devices; and registering the network device with one or more network nodes.

20 Claims, 7 Drawing Sheets

SYSTEM AND METHOD FOR AUTO-COMMISSIONING OF NETWORK DEVICE

RELATED APPLICATIONS

The present application is a National Phase of International Application No. PCT/US2022/025163, filed Apr. 18, 2022.

BACKGROUND

A cellular network is a mobile telecommunication system of mobile devices (e.g., mobile phone devices) that communicate by radio waves through a local antenna at a cellular base station (e.g., a cell tower). The coverage area in which service is provided is divided into geographical areas called "cells". Each cell is served by a separate low power multi-channel transceiver and antenna at the cell tower. Mobile devices within a cell communicate through that cell's antenna on multiple frequencies and on separate frequency channels assigned by the base station from a common pool of frequencies used by the cellular network.

A radio access network (RAN) is part of a mobile telecommunication system. A RAN implements a radio access technology. Conceptually, RANs reside between a device such as a mobile phone, a computer, or any remotely controlled machine and provides connection with its core network (CN). Depending on the standard; mobile phones and other wireless connected devices are varyingly known as user equipment (UE), terminal equipment (TE), mobile station (MS), and the like.

BRIEF DESCRIPTION OF THE DRAWINGS

Aspects of the present disclosure are best understood from the following detailed description when read with the accompanying FIGS. In accordance with the standard practice in the industry, various features are not drawn to scale. In fact, the dimensions of the various features be arbitrarily increased or reduced for clarity of discussion.

DETAILED DESCRIPTION

Figure 1:
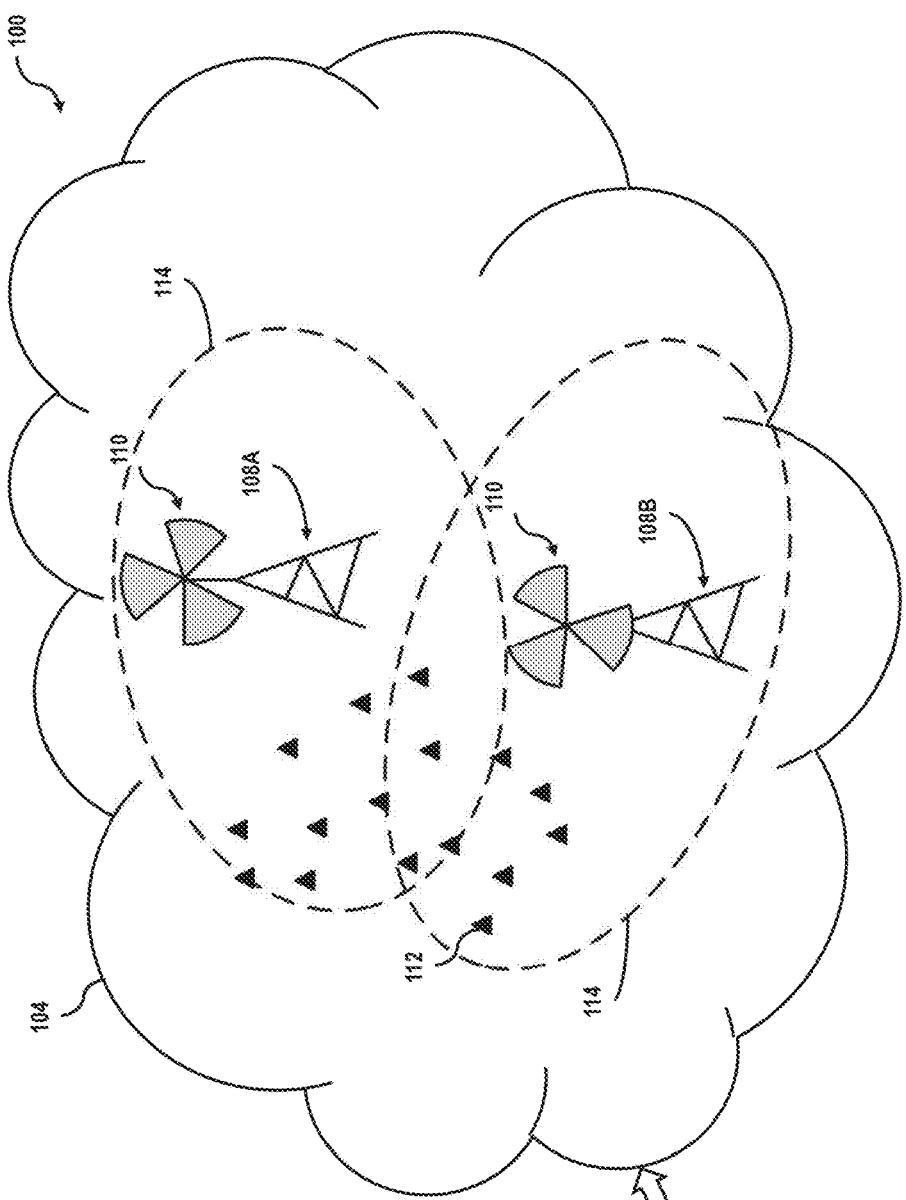
FIG. 1 is a diagrammatic representation of a device auto-commission system (DACS), in accordance with some embodiments.
Figure 1:
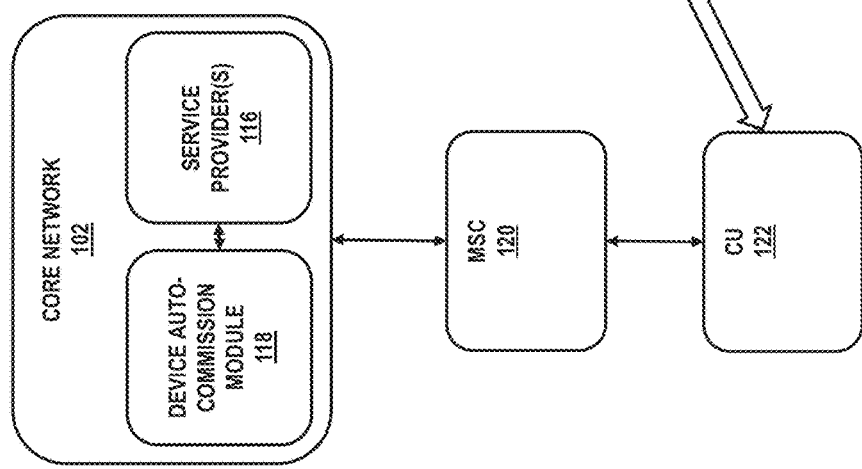

The following disclosure provides many different embodiments, or examples, for implementing different features of the provided subject matter. Specific examples of components, values, operations, materials, arrangements, or the like, are described below to simplify the present disclosure. These are, of course, merely examples and are not intended to be limiting. Other components, values, operations, materials, arrangements, or the like, are contemplated. For example, the formation of a first feature over or on a second feature in the description that follows include embodiments in which the first and second features are formed in direct contact and include embodiments in which additional features are formed between the first and second features, such that the first and second features are unable to be in direct contact. In addition, the present disclosure repeats reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, are used herein for ease of description to describe one element or feature's relationship to another element(s) or feature(s) as illustrated in the FIGS. The spatially relative terms are intended to encompass different orientations of the device in use or operation in addition to the orientation depicted in the FIGS. The apparatus is otherwise oriented (rotated 90 degrees or at other orientations) and the spatially relative descriptors used herein likewise are interpreted accordingly.

In some embodiments, a method and system provide automatic configuration of network devices in using a switch feature configured with zero-touch provisioning (ZTP). In some embodiments, ZTP is configured to assist transport teams (responsible for the transport layer in a network) to quickly commission devices in a large-scale environment, such as a RAN. In some embodiments, ZTP eliminates most of the manual labor involved with adding devices to a network. In some embodiments, the auto-commission of transport domain (layer) switches is performed by automatically generating a device configuration file for the switches and a parent delta file for termination nodes communicatively connected to the switches. In some embodiments, ZTP configures the device in seconds based on the configuration file pushed to the network device.

ZTP is a method of setting up devices that automatically configures a device using a switch feature (a network switch connects devices, such as computers, printers, wireless nodes, or the like, in a network to one another). ZTP helps information technology (IT) teams (e.g., transport teams) quickly deploy network devices in a large-scale environment, eliminating most of the manual labor involved with adding network devices to a network. The goal is to enable IT personnel and network operators to install networking devices without manual intervention. Manual configuration takes time and is prone to human error; especially when many devices must be configured at scale. ZTP is faster, reduces the chance of error, and ensures configuration consistency. ZTP is also used to automate the system updating process. Using scripts (a programming language that automates the execution of tasks otherwise performed individually by a human operator), ZTP connects configuration management platforms and other tools for configuration or updates.

Delta encoding is a way of storing or transmitting data in the form of differences (delta files) between sequential data rather than complete files. More generally this is known as data differencing. Delta encoding is sometimes called delta compression, particularly where archival histories of changes are required (e.g., in revision control software). The differences are recorded in discrete files called "delta files" or "diffs". In situations where differences are small, for example, the change of a few words in a large document or the change of a few records in a large table, delta encoding greatly reduces data redundancy. A parent delta file is an initial delta file upon which other delta files are based.

In computing, configuration files (commonly known simply as config files) are files used to configure parameters and initial settings for computer programs or devices. Configuration files are used for user applications, server processes and operating system settings.

In some embodiments, the transport team commissions a network device without manual interaction in an optimized manner within seconds. In some embodiments, once communication is established with a network device, a trigger (an action initiated as the result of an event) is sent by the ZTP process.

In computer networking, the transport layer is a conceptual division of methods in the layered architecture of protocols in the network stack in the IP suite and the open systems interconnection (OSI) model. The protocols of this layer provide host-to-host communication services for applications. The transport layer provides services such as connection-oriented communication, reliability, flow control, and multiplexing. The best-known transport protocol of the Internet protocol suite is the Transmission Control Protocol (TCP).

Commissioning is the process of assuring that systems and components of a device are designed, installed, tested, operated, and maintained according to operational requirements. The commissioning process is the integrated application of a set of engineering techniques and procedures to check, inspect and test every operational component of the device: from individual functions up to complex amalgamations (such as modules, subsystems, and systems).

In other approaches, to commission devices, engineers or transport team members physically visit the device. Visiting the device is a time consuming and error prone process. A process that includes manual operations performed physically. These manual operations include preparing the configuration file for the network device and a delta file for a terminating node (a peripheral unit in a network, or a primary designated unit within that network; a hardware component of a network that has its own role and properties within that network) by generating and inserting internet protocols (IP address s) and a hostname manually, configuring the prepared config file on the device via CLI (command line interface), generating dynamic host configuration protocol (DHCP IP Pool) manually, and registering the device on a different platform. This manual procedure is lengthy & error prone.

In some embodiments, a switch auto-commission process is configured to auto-commission transport domain (layer) switches by automatically generating device configuration files and parent delta files on the terminating edge node in seconds. In some embodiments, the switch auto-commission process is configured to register the network device on various node, such as security nodes, domain name system (DNS) nodes, evolved programmable network manager (EPNM) nodes, orchestrator nodes, or other nodes or platforms in accordance with the disclosed embodiments.

In telecommunications networks, a node is either a redistribution point or a communication endpoint. The definition of a node depends on the network and protocol layer referred. A physical network node is an electronic device that is attached to a network, and creates, receives, or transmits information over a communication channel. A passive distribution point such as a distribution frame or patch panel is consequently not a node.

The DNS is the hierarchical and decentralized naming system used to identify computers, services, and other resources reachable through the Internet or other IP networks. The resource records contained in the DNS associate domain names with other forms of information. The resource records are used to map human-friendly domain names to the numerical IP addresses computers need to locate services and devices using the underlying network protocols but have been extended over time to perform many other functions as well.

EPNM is a simplified lifecycle management tool for carrier networks of varying sizes. The solution encompasses operations, administration, provisioning and assurance across core, aggregation, edge, and access networks. With capabilities to manage carrier ethernet, optical transport, circuit emulation and more, EPNM provides end-to-end management of routed, optical, and converged multi-layer networks.

In system administration, orchestration is the automated configuration, coordination, and management of computer systems and software. Orchestration in this sense is about aligning the business request with the applications, data, and infrastructure. In the context of cloud computing, the main difference between workflow automation and orchestration is that workflows are processed and completed as processes within a single domain for automation purposes, whereas orchestration includes a workflow and provides a directed action towards larger goals and objectives.

In contrast to other approaches, the switch auto-commission process is flexible, fast to provision and manages quality of service (QOS). In some embodiments, the switch auto-commission process reduces costs as the automation is less labor-intensive, involves shorter execution times, and continues to make efficiencies as technology moves towards a self-operating network.

QOS is the description or measurement of the overall performance of a service, such as a telephony, computer network, or a cloud computing service, particularly the performance seen by the users of the network. To quantitatively measure QoS, several related aspects of the network service are often considered, such as packet loss, bit rate, throughput, transmission delay, availability, jitter, and the like. In the field of computer networking and other packet-switched telecommunication networks, QoS refers to traffic prioritization and resource reservation control mechanisms rather than the achieved service quality. QoS is the ability to provide different priorities to different applications, users, or data flows, or to guarantee a certain level of performance to a data flow.

In some embodiments, auto-commissioning transport domain switches eliminates manual efforts and errors and reduces the amount of time spent manually commissioning transport domain switches. In some embodiments, the switch auto-commission process obtains IP and hostname generation logic. In some embodiments, an IP template and hostname generation logic are configured to be used to generate IP addresses and hostname rules. In some embodiments, the switch auto-commission process obtains an IP transport trigger (IPTT) having connectivity information such as information on connected data center (CDC) and terminating mobile backhaul (MBH) node. In some embodiments, the IPTT obtains connectivity details between a network switch, data center (CDC), & router (e.g., a terminating mobile backhaul node). In some embodiments, the IPTT obtains data center, router, and connectivity information from a planning team. In some embodiments, a terminating mobile backhaul node is the location where the backhaul terminates. For example, at the core network, edge of the network, cell site, or other suitable ending location of a mobile backhaul are within the contemplated scope of the disclosure.

In computer networking, a hostname (archaically nodename) is a label that is assigned to a device connected to a computer network and is used to identify the device in various forms of electronic communication, such as the World Wide Web. Hostnames are simple names consisting of a single word or phrase, or they may be structured. Each hostname usually has at least one numeric network address associated with it for routing packets for performance and other reasons.

In some embodiments, the switch auto-commission process obtains an acceptance test plan (ATP)1A trigger that includes device serial number details. In some embodiments, the switch auto-commission process obtains the IPs, hostname generation logic, IP transport trigger, and ATPIA trigger from a database where the information is stored. In some embodiments, the switch auto-commission process generates a device configuration file and terminating MBH node delta file automatically based on the IPs, hostname generation logic, IP transport trigger, and ATPIA trigger. In some embodiments, when the network device is not reachable, the switch auto-commission process is configured to use the delta file for debugging purposes. In some embodiments, the delta file is stored in an artifactory server, and is accessible through a graphical user interface (GUI). An artifactory server is a repository manager that functions as a single access point organizing binary resources including proprietary libraries, remote artifacts, and other third-party resources. In some embodiments, a virtualized network is automated, and the device is unable to be configured manually.

In some embodiments, the switch auto-commission process pushes the generated device configuration file onto device via the artifactory server. In some embodiments, the switch auto-commission process defines an IP pool for the switch and its connected network elements. In some embodiments, the switch auto-commission process generates the IPs for the device in the network. In some embodiments, the switch auto-commission process automatically registers the switch on various nodes like: EPNM (to manage performance and register the device on the network) node, DNS node, security node, and orchestrator node. In some embodiments, the switch auto-commission process is configured to use application programming interfaces (APIs) of nodes to register the device by passing generated information like hostname and IPs of the device in an API payload as a parameter. For example, when a user wants to login into the device, the user passes through a security node first where the user inputs a name and a password. In some embodiments, the IP to DNS mapping is performed thereafter. In some embodiments, the switch auto-commission process is designed to provide simplified, converged, end-to-end lifecycle management for carrier-grade.

In some embodiments, the switch auto-commission process performs test cases of device performance and reachability via automation process acceptance test plan (ATP) 1B. In some embodiments, some parameters are static, and some parameters are variable, and the switch auto-commission process determines whether the parameters are variable (e.g., the IP address from an IP pool, host name (unique name for the device)).

FIG. 1 is a diagrammatic representation of a device auto-commission system (DACS) 100, in accordance with some embodiments.

DACS 100 includes a core network 102 communicatively connected to RAN 104 through backhaul 106, which is communicatively connected to base stations 108A and 108B (hereinafter base station 108), with antennas 110 that are wirelessly connected to UEs 112 located in geographic coverage areas 114. Core network 102 includes one or more service provider(s) 116 and device auto-commission module (DACM) 118. Core network 102 is communicatively connected to RAN 104 through mobile switching center (MSC) 120 and centralized unit (CU) 122.

Core network 102 (also known as a backbone) is a part of a computer network which interconnects networks, providing a path for the exchange of information between different local area networks (LANs) or subnetworks. In some embodiments, core network 102 ties together diverse networks in the same building, in different buildings in a campus environment, or over wide geographic areas.

In some embodiments, RAN 104 is a global system for mobile communications (GSM) RAN, a GSM/EDGE RAN, a universal mobile telecommunications system (UMTS) RAN (UTRAN), an evolved universal terrestrial radio access network (E-UTRAN, open RAN (O-RAN), or cloud-RAN (C-RAN). RAN 104 resides between user equipment 112 (e.g., mobile phone, a computer, or any remotely controlled machine) and core network 102. RAN 104 is shown as a C-RAN for purposes of simplified representation and discussion. In some embodiments, base band units (BBU) replace the C-RAN.

In conventional distributed cellular networks, equipment at the bottom and top of a base station of a cell site is the BBU. The BBU is radio equipment that links UEs to the core network and processes billions of bits of information per hour. The BBU was traditionally placed in an enclosure or shelter situated at the bottom of a base station. C-RAN, in contrast, uses fiber optic's large signal-carrying capacity to centralize numerous BBUs at a dedicated pool location or a base station. This reduces the quantity of equipment required at base stations and provides many other advantages, including lower latency. These amalgamated BBUs are referred to as the centralized unit (CU) 122.

In a hierarchical telecommunications network, backhaul portion 106 of UCS 100 comprises the intermediate link(s) between core network 102 and RAN 104. The two main methods of mobile backhaul implementations are fiber-based backhaul and wireless point-to-point backhaul. Other methods, such as copper-based wireline, satellite communications and point-to-multipoint wireless technologies are being phased out as capacity and latency requirements become higher in 4G and 5G networks. Backhaul generally refers to the side of the network that communicates with the global Internet. UE 112 communicating with a base station 108 constitute a local subnetwork. The connection between base station 108 and UE 112 begins with backhaul 106 connected to core network 102. In some embodiments, backhaul 106 includes wired, fiber optic and wireless components. Wireless sections include using microwave bands and mesh and edge network topologies that use a high-capacity wireless channel to get packets to the microwave or fiber links.

In some embodiments, base stations 108 are lattice or self-support towers, guyed towers, monopole towers, and concealed towers (e.g., towers designed to resemble trees, cacti, water towers, signs, light standards, and other types of structures). In some embodiments, base stations 108 are a cellular-enabled mobile device site where antennas and electronic communications equipment are placed, typically on a radio mast, tower, or other raised structure to create a cell (or adjacent cells) in a network. The raised structure typically supports antenna(s) 110 and one or more sets of transmitter/receivers transceivers, digital signal processors, control electronics, a remote radio head (RRH), primary and backup electrical power sources, and sheltering. Base stations are known by other names such as base transceiver station, mobile phone mast, or cell tower. In some embodiments, base stations are joined with other edge devices configured to wirelessly communicate with UEs. The edge device provides an entry point into service provider core networks, such as core network 102. Examples include routers, routing switches, integrated access devices (IADs), multiplexers, and a variety of metropolitan area network (MAN) and wide area network (WAN) access devices.

In at least one embodiment, antenna(s) 110 are a sector antenna. In some embodiments, antenna(s) 110 are a type of directional microwave antenna with a sector-shaped radiation pattern. In some embodiments, the sector degrees of arc are 60°, 90° or 120° designs with a few degrees extra to ensure overlap. Further, sector antennas are mounted in multiples when wider coverage or a full-circle coverage is desired. In some embodiments, antenna(s) 110 are a rectangular antenna, sometimes called a panel antenna or radio antenna, used to transmit and receive waves or data between mobile devices or other devices and a base station. In some embodiments, antenna(s) 110 are circular antennas. In some embodiments, antenna 110 operates at microwave or ultra-high frequency (UHF) frequencies (300 MHz to 3 GHz). In other examples, antenna(s) 110 are chosen for their size and directional properties.

In some embodiments, UEs 112 are a computer or computing system. Additionally, or alternatively, UEs 112 have a liquid crystal display (LCD), light-emitting diode (LED) or organic light-emitting diode (OLED) screen interface, such as user interface (UI) 822 (FIG. 8), providing a touchscreen interface with digital buttons and keyboard or physical buttons along with a physical keyboard. In some embodiments, UE 112 connects to the Internet and interconnect with other devices. Additionally, or alternatively, UE 112 incorporates integrated cameras, the ability to place and receive voice and video telephone calls, video games, and Global Positioning System (GPS) capabilities. Additionally, or alternatively, UEs run operating systems (OS) that allow third-party apps specialized for capabilities to be installed and run. In some embodiments, UEs 112 are a computer (such as a tablet computer, netbook, digital media player, digital assistant, graphing calculator, handheld game console, handheld personal computer (PC), laptop, mobile internet device (MID), personal digital assistant (PDA), pocket calculator, portable medial player, or ultra-mobile PC), a mobile phone (such as a camera phone, feature phone, smartphone, or phablet), a digital camera (such as a digital camcorder, or digital still camera (DSC), digital video camera (DVC), or front-facing camera), a pager, a personal navigation device (PND), a wearable computer (such as a calculator watch, smartwatch, head-mounted display, earphones, or biometric device), or a smart card.

In at least one embodiment, geographic coverage areas 114 are most any shape and size. In some embodiments, geographic coverage areas 114 are a macro-cell (covering 1 Km-30 Km), a micro-cell (covering 200 m-2 Km), or a pico-cell (covering 4 m-200 m). In some embodiments, geographic coverage areas are circular, oval or sector in shape, but geographic coverage areas 114 are configured in most any shape or size. Geographic coverage areas 114 represent the geographic area antenna 110 and UEs 112 are configured to communicate. Coverage depends on several factors, such as orography (i.e., mountains) and buildings, technology, radio frequency and perhaps most importantly for two-way telecommunications the sensitivity and transmit efficiency of UE 112. Some frequencies provide better regional coverage, while other frequencies penetrate better through obstacles, such as buildings in cities. The ability of a UE to connect to a base station depends on the strength of the signal. Coverage gaps are caused by most anything such as faulty equipment, bad weather, animals, accidents, and the like. Coverage gaps occur through the loss of one or more sets of transmitters, receivers, transceivers, digital signal processors, control electronics, GPS receivers, primary and backup electrical power sources, and antennas. Additionally, or alternatively, coverage gaps exist because of areas never previously covered by cellular service or created by removal of a cell tower or the like. In some embodiments, coverage gaps develop after the service covering an area is lost for any reason. In other examples, a coverage gap is any area without any cell coverage service to UE for whatever reason.

Service provider(s) 116 are businesses or organizations that sell bandwidth or network access. Service provider(s) 116 provide direct Internet backbone access to internet service providers and usually access to network access points (NAPs). Service providers are sometimes referred to as backbone providers or internet providers. Service providers consist of telecommunications companies, data carriers, wireless communications providers, Internet service providers, and cable television operators offering high-speed Internet access.

MSC 120 is a complex switching mechanism to provide connection to UEs, such as UEs 112, within the network, such as RAN 104, and users of other mobile networks. MSC 120 also coordinates the communications channels and processes within the network and establishes communication to a CN, such as CN 102. In some embodiments, MSC 120 includes one or more switches of DACS 100. In some embodiments, switches are located at base stations 108, CU 122, CN 102, and/or other locations within DACS 100 in accordance with embodiments of the disclosure.

CU 122 is connected between a core network, such as CN 102, and distributed units (DUs). Within a RAN, such as RAN 104, BBUs are split into the distributed unit (DU) and the centralized unit (CU). The DU operates close to the Remote Radio Head (RRH acts as a transceiver to UEs, such as UEs 112, and is basically an antenna array, such as antennas 110, arranged in different direction to cover large area, such as coverage areas 112, surrounding a cell tower, such as cell tower 108) and is responsible for real-time layer 1 (physical layer) such as orthogonal frequency-division multiple access (OFDMA) and multiple-input-multiple-output (MIMO) as well as the layer 2 scheduling functions such as RLC (Radio Link Control) and MAC (Media Access Control). RLC contains automatic repeat request (ARQ) and hybrid automatic repeat request (HARQ) to support the re-transmission functions and the MAC mainly provides QoS (Quality of Service) features.

DACM 118 is configured to automatically generate a configuration file that includes parameters and initial settings for a network device in a network. In some embodiments, the network device is a switch located in MSC 120. DACM 118 is further configured to generate a delta file for a terminating MBH node communicatively connected to the network device that includes updates or parameter changes between a removed device and the network device. In some embodiments, a network device, as used here in the disclosure, includes replacement memory and/or replacement firmware (replacement for purposes of present disclosure include replacement software and firmware). There are events in networking where devices lose memory and, in some cases, have firmware erased (e.g., in storms, hacking events, and other suitable events within the contemplated scope of the disclosure. In some embodiments, in response to memory or firmware being compromised (a much rarer event when compared to a device needing full replacement) DACM 118 is configured to automatically generate a configuration file that includes parameters and initial settings for a replacement memory and/or firmware in a network.

A switch (also called a network switch, switching hub, bridging hub, and a MAC bridge) is a networking device that connects devices on a computer network by using packet switching to receive and forward data to the destination device. A network switch is a multiport network bridge that uses MAC addresses to forward data at the data link layer (layer 2) of an open system interconnection (OSI) model. In some embodiments, switches forward data at the network layer (layer 3) by additionally incorporating routing functionality. Such switches are commonly known as layer-3 switches or multilayer switches.

Figure 7:
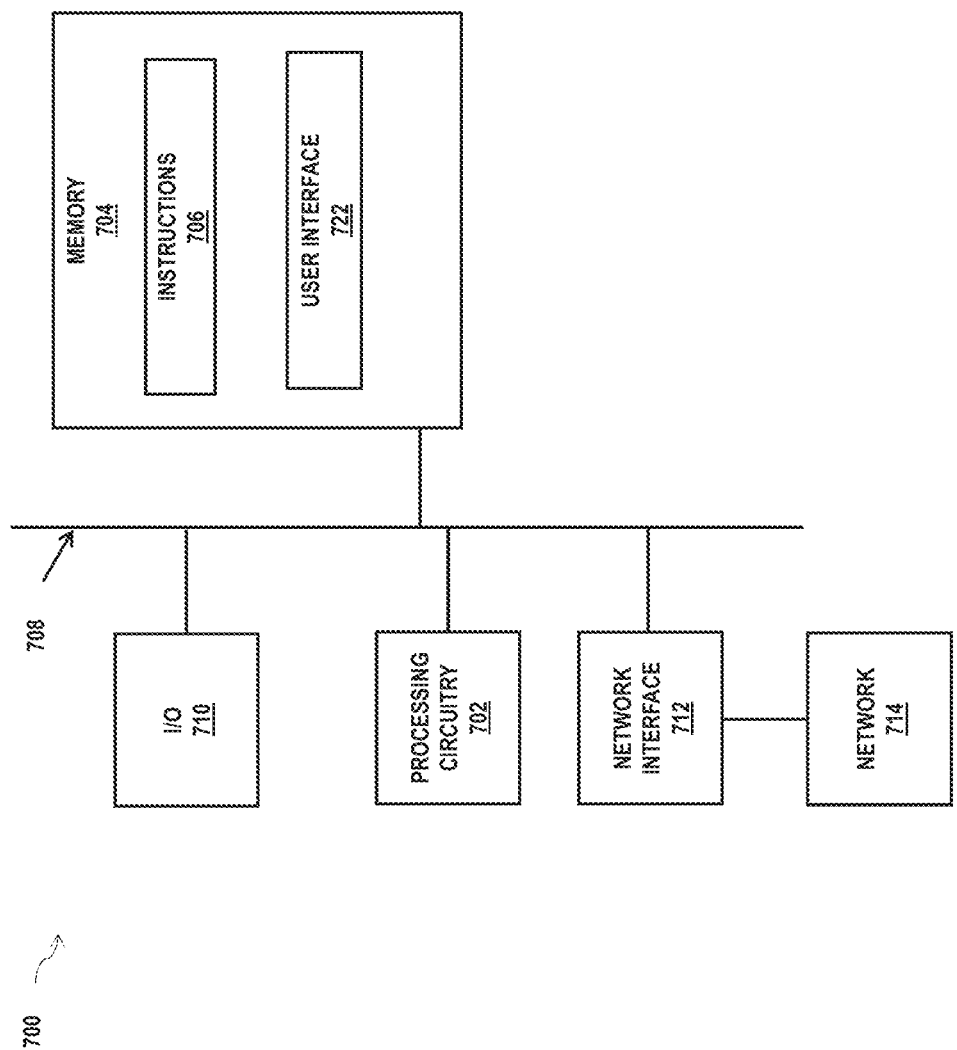
FIG. 7 is a high-level functional block diagram of a processor-based system, in accordance with some embodiments.

In some embodiments, the configuration file and the delta file are generated based upon obtained IPs, hostname generation logic, network device's serial number, and connectivity information for a data center and the terminating MBH node. In some embodiments, the IPs, hostname generation logic, network device's serial number, and connectivity information for a data center and the terminating MBH node are retrieved from a database, such as memory 704 (FIG. 7). In some embodiments, the IPs and hostname generation logic are obtained via a template presented on a user interface through a GUI, such as UI 722 (FIG. 7). In some embodiments, an engineer or network operator inputs the IPs and or hostname generation logic into a template and the information is stored on a database for use by DACM 118.

In some embodiments, the IP transport trigger that contains connectivity information like connected data center and terminating MBH node is provided by a RAN network planning team. In some embodiments, an ATPIA trigger containing the network device serial number is provided by a RAN network planning team. RAN planning teams are responsible for proposing locations, configurations, and settings of the new network nodes to be rolled out in a wireless network.

A data center is a building, a dedicated space within a building, or a group of buildings used to house computer systems and associated components, such as telecommunications and storage systems. IT operations include redundant or backup components and infrastructure for power supply, data communication connections, environmental controls (e.g., air conditioning, fire suppression), and various security devices.

DACM 118 pushes the device configuration file to the network device via an artifactory server. DACM 118 identifies an IP address pool for the network device and connected network elements, such as the terminating MBH node. DACM 118 automatically registers the network device with one or more nodes, such as an EPNM node to manage performance and register the network device on RAN 104, a DNS node, a security node, and an orchestrator. In some embodiments, the registration of the network device is preformed using APIs of the nodes to pass generated information such as hostname and IP of the network device in an API payload as a parameter. The API payload is the body of a request and response message. The API payload contains the data that is sent to a server with an API request.

Figure 2:
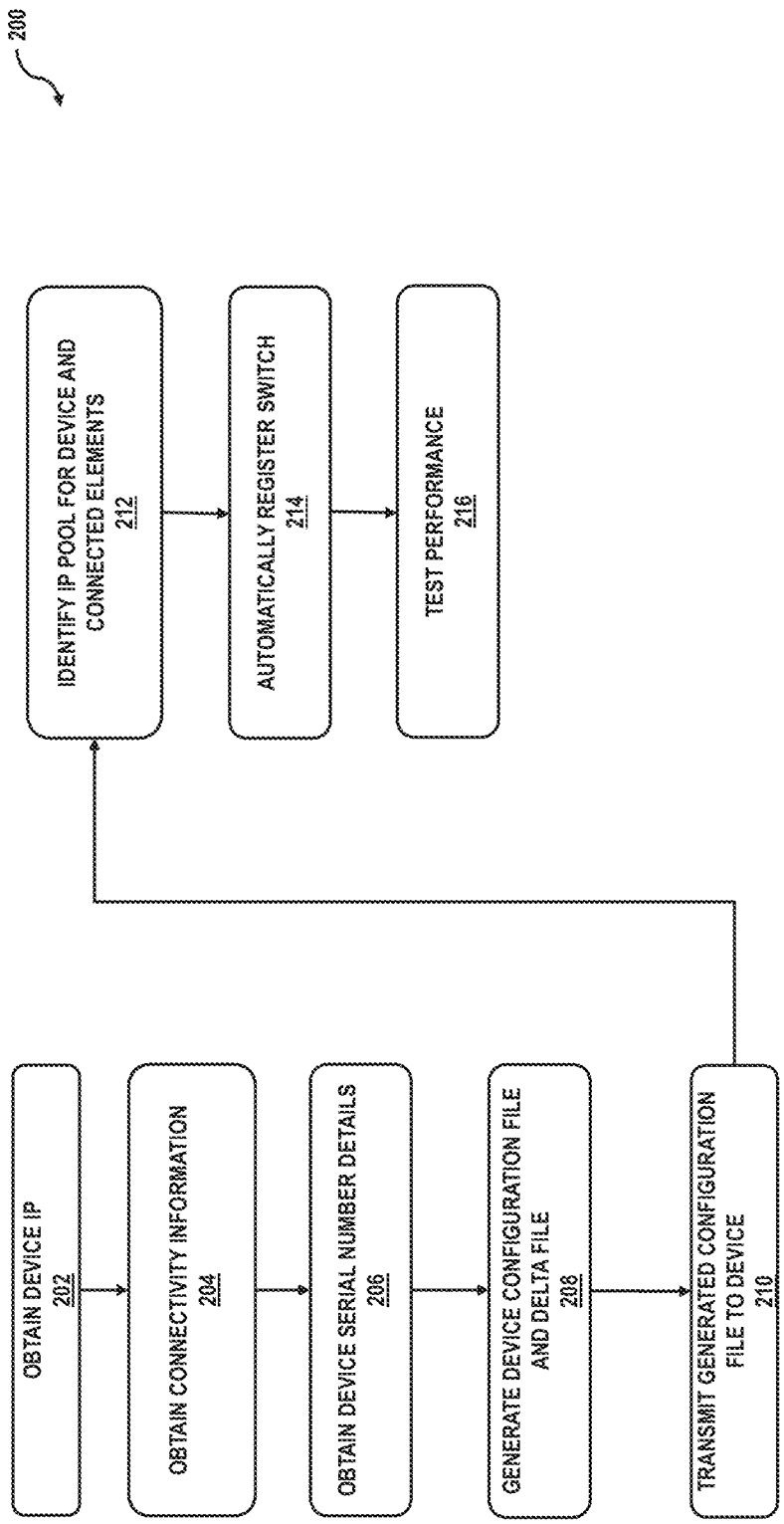
FIG. 2 is a flow diagram of a device auto-commission algorithm (DACA), in accordance with some embodiments.

FIG. 2 is a flow diagram of a device auto-commission algorithm (DACA) 200, in accordance with some embodiments.

While operations are, for ease of description, laid out in a described order, there is no limitation that any operation be performed in the order described unless specifically stated as such. Each operation is configured to be performed at any point in DACA 200.

At operation 202 of method 200, IPs and hostname generation logic are obtained. In a non-limiting example, IPs and hostname generation logic are obtained from a database, such as memory 704. Continuing with the example, the IPs and hostname logic are uploaded to the database by a network planning team. Continuing with the example, an engineer, network operation or planning team member uploads the IPs and hostname logic via a template provide through a GUI. From operation 202, flow proceeds to operation 204.

At operation 204 of method 200, connectivity information, such as information on connected CDC and terminating MBH node, is obtained from an IP transport trigger. In a non-limiting example, connectivity information is obtained from a database, such as memory 704 where the connectivity information is stored after the IP transport trigger. Continuing with the example, the connectivity information is uploaded to the database by a network planning team. Continuing with the example, an engineer, network operation or planning team member uploads the connectivity information via a template provide through a GUI. From operation 204, flow proceeds to operation 206.

At operation 206 of method 200, a serial number for a network device is obtained through a ATPIA trigger. In a non-limiting example, the serial number is obtained from a database, such as memory 704 where the serial number is stored after the ATPIA trigger. Continuing with the example, the serial number is uploaded to the database by a network planning team. Continuing with the example, an engineer, network operation or planning team member uploads the serial number via a template provided through a GUI. From operation 206, flow proceeds to operation 208.

At operation 208 of method 200, a device configuration file and terminating MBH node delta file are automatically generated based on the information obtained in operations 202-206. In a non-limiting example, the delta file is stored in an artifactory server and is accessible through a GUI. In another non-limiting example, in the event the network device is not reachable (or communicating), the DACA 200 is configured to use the delta file for debugging purposes. From operation 208, flow proceed to operation 210.

At operation 210 of method 200, the generated configuration device is pushed onto the network device. In a non-limiting example, the generated configuration device is pushed onto the network device via the artifactory server. Flow proceeds from operation 210 to operation 212.

At operation 212 of method 200, an IP pool for the network device and connected network elements are identified. In a non-limiting example, the IP address for the network device in the network is generated. Flow proceeds from operation 212 to operation 214.

At operation 214 of method 200, the replacement network device is registered on various nodes automatically. In a non-limiting example, using APIs of nodes to register the replacement network device by passing generated information, such as hostname and IP of the replacement network device in API payload as a parameter. Continuing with the non-limiting example, nodes such as EPNM, DNS, security and orchestrator are provided with registration information of the replacement network device through API payload. Flow proceeds from operation 214 to operation 216.

At operation 216 of method 200, test cases of the replacement network device performance and reachability are performed via an ATPIB automation process.

Figure 3:
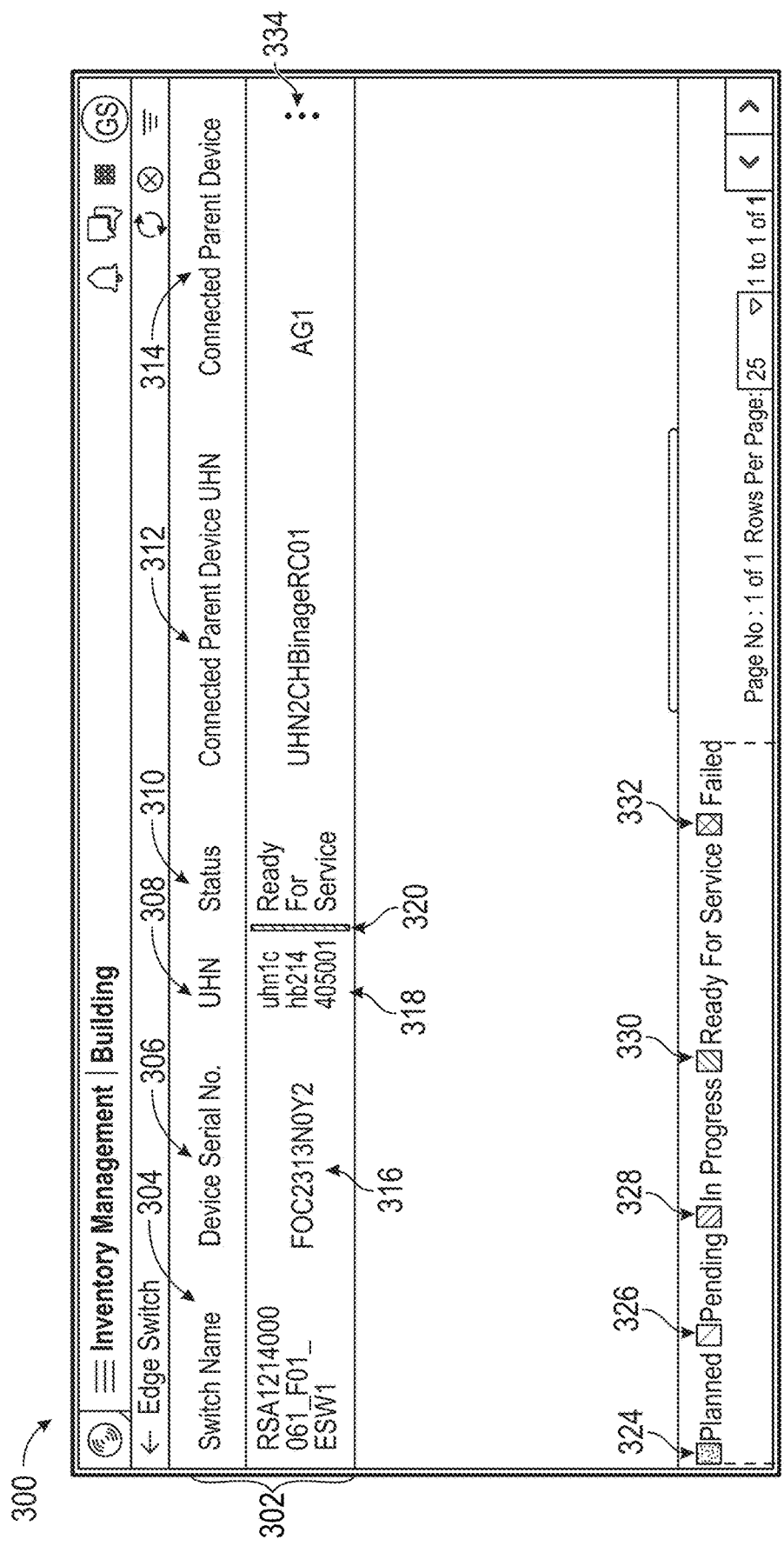
FIG. 3 is a pictorial representation a device serial number and connectivity population graphical user interface, in accordance with some embodiments.

FIG. 3 is a pictorial representation a device serial number and connectivity population graphical user interface 300, in accordance with some embodiments.

GUI 300 is presented in table form presenting populated information for an edge switch, such as serial number 316 and generated unadorned hostname (UHN) 318. Table 302 includes headings, such as switch name 304, device serial No. 306, UHN 308, status 310, connected parent device UHN 312 and connected parent device 314.

GUI 300 is shown populated with serial number 316 and connectivity information of the network device with UHN 318. In some embodiments, DACS 200 has obtained the edge switches serial number 314 and hostname 316 from operations 202-206.

Status bar 320 provides an indication of the edge switch's current operational condition. Referring to legend 322, an operation, engineer, or network operation determines whether the switch is planned 324, pending 326, in progress 328, ready for service 330, or whether the edge switch has failed 332 and is in a debugging condition.

GUI 300 further includes a kebab menu icon 334. A kebab menu, also known as a three dots menu, and a three vertical dots menu, is an icon used to open a menu with additional options. The icon is most often located at the top-right or top-left of a screen or window.

Figure 4:
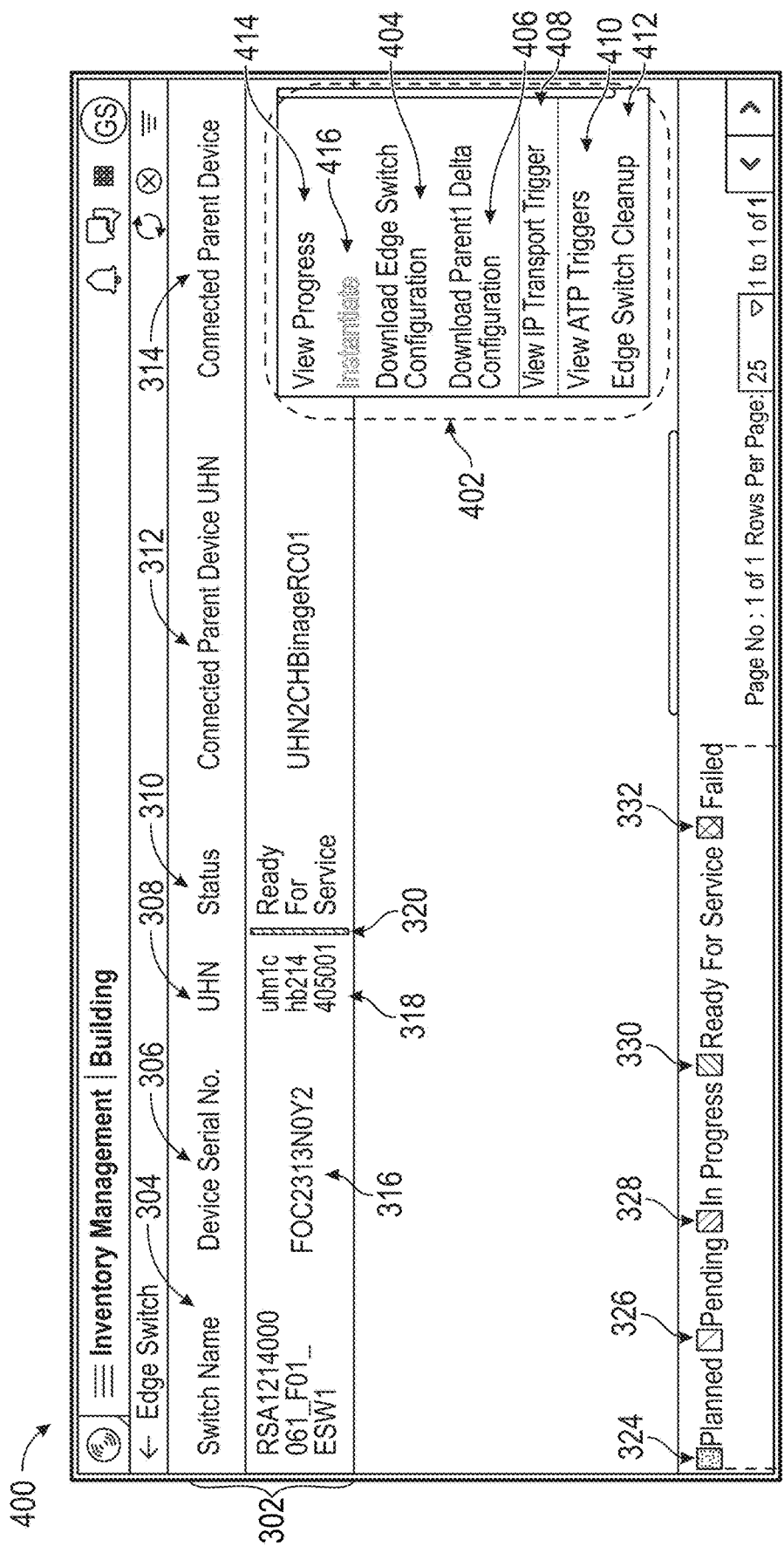
FIG. 4 is a pictorial representation of a device configuration graphical user interface, in accordance with some embodiments.

FIG. 4 is a pictorial representation of a device configuration graphical user interface 400, in accordance with some embodiments.

Menu 402 is presented when a user clicks or initiates icon 334. Menu 402 provides an option to download auto-generated edge switch configuration file 404. An option to download parent delta file configuration 406. An option to view an IP transport trigger 408. An option to view ATP triggers 410. In some embodiments, the ATP triggers includes ATP1A and/or ATP 1B. An option to perform debugging with edge switch cleanup 412. An option to view progress 414p of onboarding a network device, such as an edge switch. And an option to instantiate 416 when the network device has been properly installed and commissioned.

For ease of description, FIG. 4 repeats reference numerals. This repetition is for the purpose of simplicity and clarity and does not in itself dictate a relationship between the various embodiments and/or configurations discussed.

Figure 5:
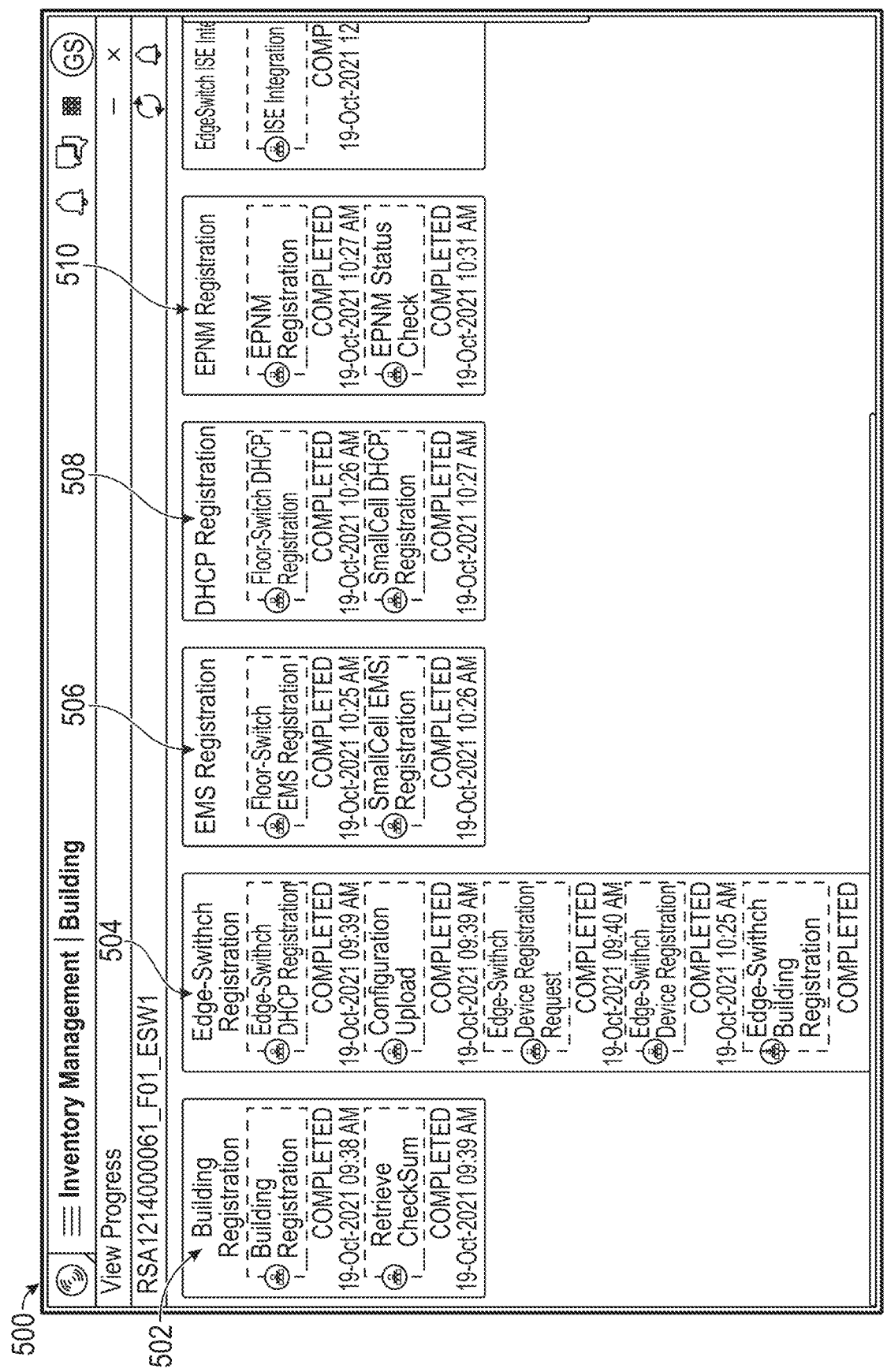
FIGS. 5 and 6 are pictorial representations of a call flow and registration graphical user interface, in accordance with some embodiments.
Figure 6:
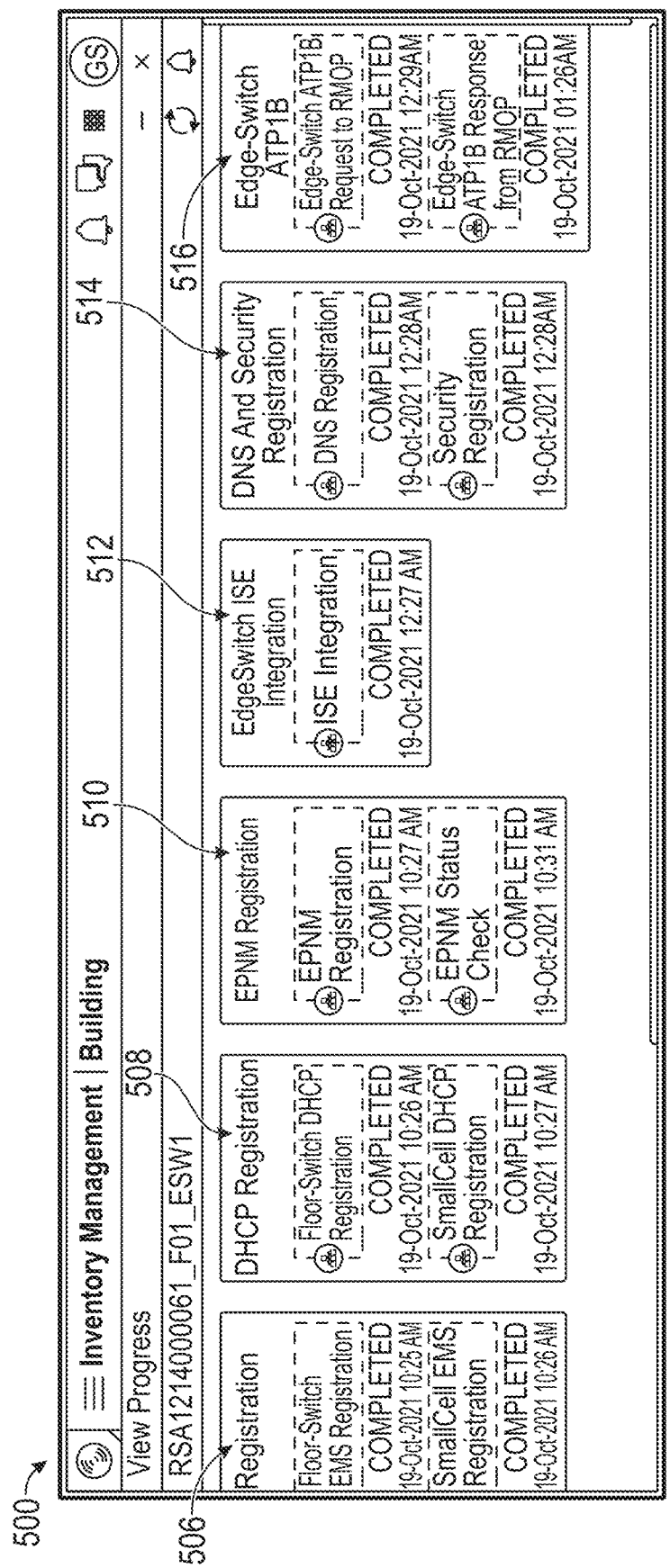

FIGS. 5 and 6 are pictorial representations of a call flow and registration graphical user interface 500, in accordance with some embodiments.

GUI 500 displays to a user the automatic registration process with various nodes. As discussed, DACA 200 in operation 214 automatically registers the network device, such as edge switch RSA1214000061_F01_ESW1.

FIG. 5 shows a building node 502, where the network device is registered within a building connected to the network. Edge-switch node 504, where the network device is registered with other switches, such as in MSC 120. Element management system (EMS) node 506, where the network device is registered with systems and applications that manage network elements. DHCP node 508, where the network device is registered to automatically assign IP addresses and other communication parameters to the network device. EPNM node 510, where the network device is registered to manage the network, such as networks 102 and 104.

FIG. 6 shows an edge switch identity services engine (ISE) node 512, where the network device is registered to enforce compliance and security. DNS and security node 514, where the network device is registered with the domain name system and the security system. And edge-switch ATPIB node 514, where the network device is registered for testing purposes to determine device performance and reachability.

FIG. 7 is a block diagram of a switch auto-commission processing circuitry 700 in accordance with some embodiments. In some embodiments, switch auto-commission processing circuitry 700 is a general-purpose computing device including a hardware processing circuitry 702 and a non-transitory, computer-readable storage medium 704. Storage medium 704, amongst other things, is encoded with, i.e., stores, computer program code 706, i.e., a set of executable instructions such as device auto-commission algorithm, such as DACA 200. Execution of instructions 706 by hardware processing circuitry 702 represents (at least in part) a switch auto-commission tool which implements a portion or of the methods described herein in accordance with one or more embodiments (hereinafter, the noted processes and/or methods).

Processing circuitry 702 is electrically coupled to a computer-readable storage medium 704 via a bus 708. Processing circuitry 702 is also electrically coupled to an I/O interface 710 by bus 708. A network interface 712 is also electrically connected to processing circuitry 702 via bus 708. Network interface 712 is connected to a network 714, so that processing circuitry 702 and computer-readable storage medium 704 connecting to external elements via network 714. Processing circuitry 702 is configured to execute computer program code 706 encoded in computer-readable storage medium 704 to cause switch auto-commission processing circuitry 700 to be usable for performing a portion or of the noted processes and/or methods. In one or more embodiments, processing circuitry 702 is a central processing unit (CPU), a multi-processor, a distributed processing system, an application specific integrated circuit (ASIC), and/or a suitable processing unit.

In one or more embodiments, computer-readable storage medium 704 is an electronic, magnetic, optical, electromagnetic, infrared, and/or a semiconductor system (or apparatus or device). For example, computer-readable storage medium 704 includes a semiconductor or solid-state memory, a magnetic tape, a removable computer diskette, a random-access memory (RAM), a read-only memory (ROM), a rigid magnetic disk, and/or an optical disk. In one or more embodiments using optical disks, computer-readable storage medium 704 includes a compact disk-read only memory (CD-ROM), a compact disk-read/write (CD-R/W), and/or a digital video disc (DVD).

In one or more embodiments, storage medium 704 stores computer program code 706 configured to cause switch auto-commission processing circuitry 500 to be usable for performing a portion or of the noted processes and/or methods. In one or more embodiments, storage medium 704 also stores information, such as device auto-commission algorithm which facilitates performing a portion or of the noted processes and/or methods.

Switch auto-commission processing circuitry 700 includes I/O interface 710. I/O interface 710 is coupled to external circuitry. In one or more embodiments, I/O interface 710 includes a keyboard, keypad, mouse, trackball, trackpad, touchscreen, and/or cursor direction keys for communicating information and commands to processing circuitry 702.

Switch auto-commission processing circuitry 700 is also include network interface 712 coupled to processing circuitry 702. Network interface 712 allows switch auto-commission processing circuitry 700 to communicate with network 714, to which one or more other computer systems are connected. Network interface 712 includes wireless network interfaces such as BLUETOOTH, WIFI, WIMAX, GPRS, or WCDMA; or wired network interfaces such as ETHERNET, USB, or IEEE-864. In one or more embodiments, a portion or noted processes and/or methods, is implemented in two or more switch auto-commission processing circuitry 700.

Unified coverage processing circuitry 700 is configured to receive information through I/O interface 710. The information received through I/O interface 710 includes one or more of instructions, data, design rules, libraries of standard cells, and/or other parameters for processing by processing circuitry 702. The information is transferred to processing circuitry 702 via bus 708. Unified coverage compensation processing circuitry 700 is configured to receive information related to a UI through I/O interface 710. The information is stored in computer-readable medium 704 as user interface (UI) 722.

In some embodiments, a portion, or the noted processes and/or methods is implemented as a standalone software application for execution by a processor. In some embodiments, a portion, or the noted processes and/or methods is implemented as a software application that is a part of an additional software application. In some embodiments, a portion, or the noted processes and/or methods is implemented as a plug-in to a software application.

In some embodiments, the processes are realized as functions of a program stored in a non-transitory computer readable recording medium. Examples of a non-transitory computer-readable recording medium include, but are not limited to, external/removable and/or internal/built-in storage or memory unit, e.g., one or more of an optical disk, such as a DVD, a magnetic disk, such as a hard disk, a semiconductor memory, such as a ROM, a RAM, a memory card, and the like.

In some embodiments, a computer-implemented method for network switch auto-commissioning includes generating, automatically, a device configuration file that includes parameters and initial settings for a network device; generating, automatically, a delta file that includes parameters and initial settings for a mobile backhaul (MBH) node communicatively connected to the network device; transmitting the device configuration file to the network device; obtaining an IP address pool for the network device and connected network devices; and registering the network device with one or more network nodes.

In some embodiments, the computer-implemented method further includes responsive to being unable to communicate with the network device, troubleshooting the network device based on the delta file.

In some embodiments, the computer-implemented method further includes storing the delta file on an artifactory server, where the delta file is accessible through a graphical user interface (GUI).

In some embodiments, the computer-implemented method further includes transmitting the delta file to the MBH node.

In some embodiments, the registering the network device with the one or more nodes further includes registering the network device through application programming interfaces (APIs) of the one or more nodes; and transmitting generated information that includes hostname and IP address of the network device in an API payload as a parameter.

In some embodiments, the computer-implemented method further includes performing test cases of performance and accessibility of the network device.

In some embodiments, the computer-implemented method further includes determining whether parameters included in the device configuration file are variable.

In some embodiments, the computer-implemented method further includes obtaining an IP template and hostname generation logic where the IP template and hostname generation logic is configured to be used to generate IPs and hostname rules.

In some embodiments, the computer-implemented method further includes obtaining an IP transport trigger (IPTT) that includes connectivity information such as Connected Data Center (CDC) and Terminating mobile backhaul (MBH) Node.

In some embodiments, the computer-implemented method further includes obtaining an acceptance test plan trigger that includes a device serial number for the network device.

In some embodiments, the computer-implemented method further includes obtaining the IP template, hostname generation logic, IPTT, and the acceptance test plan trigger from a database.

In some embodiments, a system, includes a memory having non-transitory instructions stored; and processing circuitry coupled to the memory, and being configured to execute the non-transitory instructions, thereby causing the processing circuitry to generate automatically, a device configuration file that includes parameters and initial settings for a network device; generate, automatically, a delta file that includes parameters and initial settings for a mobile backhaul (MBH) node communicatively connected to the network device; transmit the device configuration file to the network device; transmit the delta file to the terminating MBH node communicatively connected to the network device; obtain an IP address pool for the network device and connected network elements; and register the network device with one or more nodes.

In some embodiments, the processing circuitry configured to execute the non-transitory instructions further causing the processing circuitry to responsive to being unable to communicate with the network device, troubleshoot the network device with the delta file.

In some embodiments, the processing circuitry configured to execute the non-transitory instructions further causing the processing circuitry to store the delta file on an artifactory server, where the delta file is accessible through a graphical user interface (GUI).

In some embodiments, the processing circuitry configured to execute the non-transitory instructions further causing the processing circuitry to register the network device through application programming interfaces (APIs) of the one or more nodes; and transmit generated information that includes hostname and IP address of the network device in an API payload as a parameter.

In some embodiments, the processing circuitry configured to execute the non-transitory instructions further causing the processing circuitry to perform test cases of performance and accessibility of the network device.

In some embodiments, the processing circuitry configured to execute the non-transitory instructions further causing the processing circuitry to determine whether parameters included in the device configuration file are variable.

In some embodiments, a computer-readable medium including instructions executable by processing circuitry to cause the processing circuitry to perform operations includes generating, automatically, a device configuration file that includes parameters and initial settings for a network device; generating, automatically, a delta file that includes parameters and initial settings for a mobile backhaul (MBH) node communicatively connected to the network device; transmitting the device configuration file to the network device; transmitting the delta file to the MBH node communicatively connected to the network device; obtaining an IP address pool for the network device and connected network elements; and registering the network device with one or more nodes.

In some embodiments, the instructions executable by the processing circuitry further causes the processing circuitry to perform operations includes responsive to being unable to communicate with the network device, troubleshooting the network device with the delta file.

In some embodiments, the instructions executable by the processing circuitry further causes the processing circuitry to perform operations including storing the delta file on an artifactory server, where the delta file is accessible through a graphical user interface (GUI).

The foregoing outlines features of several embodiments so that those skilled in the art better understand the aspects of the present disclosure. Those skilled in the art should appreciate that they readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they make various changes, substitutions, and alterations herein without departing from the spirit and scope of the present disclosure.

What is claimed is:

1. A computer-implemented method for network switch auto-commissioning, the method comprising:
    generating, automatically, a device configuration file that includes parameters and initial settings for a network device;
    generating, automatically, a delta file that includes parameters and initial settings for a mobile backhaul (MBH) node communicatively connected to the network device, wherein the delta file captures differences between an initial iteration of the device configuration file and subsequent iterations of the device configuration file;
    transmitting the device configuration file to the network device;
    obtaining an IP address pool for the network device and connected network devices;
    registering the network device with one or more network nodes; and
    responsive to being unable to communicate with the network device, troubleshooting the network device based on the delta file.

2. The computer-implemented method of claim 1, wherein the troubleshooting comprises debugging an auto-commission processing for the network device using the delta file.

3. The computer-implemented method of claim 1, further comprising:
    storing the delta file on an artifactory server, where the delta file is accessible through a graphical user interface (GUI).

4. The computer-implemented method of claim 1, further comprising:
    transmitting the delta file to the MBH node.

5. The computer-implemented method of claim 4, wherein the registering the network device with the one or more nodes further comprises:
    registering the network device through application programming interfaces (APIs) of the one or more nodes; and
    transmitting generated information that includes hostname and IP address of the network device in an API payload as a parameter.

6. The computer-implemented method of claim 1, further comprising:
    performing test cases of performance and accessibility of the network device.

7. The computer-implemented method of claim 1, further comprising:
    determining whether parameters included in the device configuration file are variable.

8. The computer-implemented method of claim 1, further comprising:
    obtaining an IP template and hostname generation logic where the IP template and hostname generation logic is configured to be used to generate IPs and hostname rules.

9. The computer-implemented method of claim 8, further comprising:
    obtaining an IP transport trigger (IPTT) that includes connectivity information such as Connected Data Center (CDC) and Terminating mobile backhaul (MBH) Node.

10. The computer-implemented method of claim 9, further comprising:
    obtaining an acceptance test plan trigger that includes a device serial number for the network device.

11. The computer-implemented method of claim 10, further comprising:
    obtaining the IP template, hostname generation logic, IPTT, and the acceptance test plan trigger from a database.

12. A system, comprising:
    a memory having non-transitory instructions stored; and
    processing circuitry coupled to the memory, and being configured to execute the non-transitory instructions, thereby causing the processing circuitry to:
        generate automatically, a device configuration file that includes parameters and initial settings for a network device;
        generate, automatically, a delta file that includes parameters and initial settings for a mobile backhaul (MBH) node communicatively connected to the network device, wherein the delta file captures differences between an initial iteration of the device configuration file and subsequent iterations of the device configuration file;
        transmit the device configuration file to the network device;
        transmit the delta file to the terminating MBH node communicatively connected to the network device;
        obtain an IP address pool for the network device and connected network elements;
        register the network device with one or more nodes; and responsive to being unable to communicate with the network device, troubleshoot the network device with the delta file.

13. The system of claim 12, wherein the processing circuitry configured to execute the non-transitory instructions further causing the processing circuitry to:
troubleshoot an auto-commission processing for the network device using the delta file for debugging.

14. The system of claim 12, wherein the processing circuitry configured to execute the non-transitory instructions further causing the processing circuitry to:
store the delta file on an artifactory server, where the delta file is accessible through a graphical user interface (GUI).

15. The system of claim 12, wherein the processing circuitry configured to execute the non-transitory instructions further causing the processing circuitry to:
register the network device through application programming interfaces (APIs) of the one or more nodes; and
transmit generated information that includes hostname and IP address of the network device in an API payload as a parameter.

16. The system of claim 12, wherein the processing circuitry configured to execute the non-transitory instructions further causing the processing circuitry to:
perform test cases of performance and accessibility of the network device.

17. The system of claim 12, wherein the processing circuitry configured to execute the non-transitory instructions further causing the processing circuitry to:
determine whether parameters included in the device configuration file are variable.

18. A non-transitory medium including instructions executable by processing circuitry to cause the processing circuitry to perform operations comprising:
generating, automatically, a device configuration file that includes parameters and initial settings for a network device;
generating, automatically, a delta file that includes parameters and initial settings for a mobile backhaul (MBH) node communicatively connected to the network device, wherein the delta file captures differences between an initial iteration of the device configuration file and subsequent iterations of the device configuration file;
transmitting the device configuration file to the network device;
transmitting the delta file to the MBH node communicatively connected to the network device;
obtaining an IP address pool for the network device and connected network elements;
registering the network device with one or more nodes; and
responsive to being unable to communicate with the network device, troubleshooting the network device with the delta file.

19. The non-transitory medium of claim 18, wherein the instructions executable by the processing circuitry further causes the processing circuitry to perform operations comprising:
troubleshooting an auto-commission processing for the network device using the delta file for debugging.

20. The non-transitory medium of claim 19, wherein the instructions executable by the processing circuitry further causes the processing circuitry to perform operations comprising:
storing the delta file on an artifactory server, where the delta file is accessible through a graphical user interface (GUI).

* * * * *